United States Patent [19]

Lukaszczyk et al.

[11] 3,734,710
[45] May 22, 1973

[54] HERBICIDAL METHOD EMPLOYING CHLORO-METHANE SULFONANILIDES

[75] Inventors: Alfons Lukaszczyk, Basel, Switzerland; Georg Pissiotas, Loerrach, Germany

[73] Assignee: Ciba Limited, Basel, Switzerland

[22] Filed: Apr. 22, 1970

[21] Appl. No.: 30,982

[30] Foreign Application Priority Data

Apr. 30, 1969   Switzerland..........................6617/69

[52] U.S. Cl. ..............................71/103, 71/72, 71/76
[51] Int. Cl. ................................................A01n 9/16
[58] Field of Search..........................................71/103

[56] References Cited
UNITED STATES PATENTS

| | | | |
|---|---|---|---|
| 3,246,976 | 4/1966 | Brokke et al. | 71/103 |
| 3,046,104 | 7/1962 | Ehlers et al. | 71/103 |
| 3,586,717 | 6/1971 | Harrington | 71/103 |
| 2,412,510 | 12/1946 | Jones | 71/117 |

FOREIGN PATENTS OR APPLICATIONS 971,219   2/1962   Great Britain..........................71/103

*Primary Examiner*—Lewis Gotts
*Assistant Examiner*—Catherine L. Mills
*Attorney*—Harry Goldsmith, Joseph G. Kolodny and Mario A. Monaco

[57]         ABSTRACT

Halogenmethylsulfonamides, preferably halogenmethylsulfonanilides which are substituted or unsubstituted in the phenyl nucleus may be used as plant influencing agents, for example as selective herbicides.

1 Claim, No Drawings

HERBICIDAL METHOD EMPLOYING CHLORO-METHANE SULFONANILIDES

This invention relates to a process for combating undesired plant growth in crop cultures, which comprises applying halogenmethylsufonamides as selective herbicides or to a process of influencing plants broadly. The active substances are encompassed by the formula

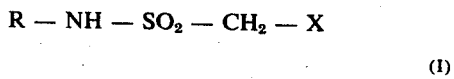

(I)

in which X represents halogen and R stands for a phenyl radical which may be unsubstituted or substituted by $C_1$–$C_4$-alkyl, $C_1$–$C_4$-alkylsulfonyl, —CN, —SCN, $NO_2$, NO, carboxy, carbalkoxy, optionally acetalized —CHO, sulfonic acid, sulfamyl, $C_1$–$C_5$-haloaliphat, especially —$CCl_3$, —$CCl_2F$, $CClF_2$, —$CF_3$, —$C_2F_5$ or halogen.

An especially active group of compounds of the formula (I) comprises those in which X represents halogen, especially Cl or Br, and R stands for a phenyl radical which is unsubstituted or substituted by $C_1$–$C_4$-alkyl, $C_1$–$C_4$-alkyl-sulfonyl, $NO_2$, $CF_3$, $CCl_3$, $CF_2Cl$, $CCl_2F$ or halogen.

Especially good herbicidal activity is observed when the phenyl nucleus R contains electronegative (= electron drawing) substituents — which does not preclude the presence of electro-neutral substituents.

In a rather narrow sense, those compounds are important in which the 2-, 2,5-, 3,4-, 3,5 or 2,4,5-positions of the phenyl nucleus are occupied by identical or different substituents of the kind mentioned. X is halogen, preferably chlorine or bromine.

For the 2-position, halogen, $NO_2$, $CF_3$, $CCl_3$ or CN are preferred substituents.

For the 2,5-positions, halogen, $NO_2$, $CCl_3$, $CF_3$, CN are preferred.

For the 3,4-positions, halogen, $CCl_3$, $CF_3$, CN, alkoxycarbonyl, alkylsulfonyl, $NO_2$ and NO are preferred.

For the 3,5-positions, halogen, $CCl_3$, $CF_3$ and $NO_2$ are preferred.

For the 2,4,5-positions, halogen, $CCl_3$, $CF_3$, NO, $NO_2$, CN, alkoxycarbonyl, alkylsulfonyl, —CHO and alkyl are preferred.

Halogen here denotes F, Cl, Br and I; Cl and Br are preferred.

Unexpectedly, the herbicidal and plant-influencing action of the sulfonanilides of the formula (I) is very good. These substances are suitable as selective herbicides in the culture of useful plants for combating undesired broad-leafed and grass-like weeds and in addition they favorably influence the development of crop plants. Such influence includes growth regulation, increasing the resistance to external influences (frost, drought, salt content of the soil) and also the regulation of blossoming and ripening. Defoliating and desiccating properties are also observed.

The invention also comprises the use of selective herbicidal agents containing as active ingredient one or more than one compounds of the formula (I), together with a suitable carrier, solvent, diluent, emulsifier, dispersant, wetting agent, adhesive agent, fertilizer, or other pest combating agents or other plant influencing agents, including growth hormones, such as 2,4D, 2,4DP, MCPA, MCPB, MCPP, CCC, CMH, BMH, etc.

The active substances of the formula (I) according to this invention may be present in the formulations in admixture with other known active substances. The formulations as a rule contain between 0.1 and 90 percent by weight of active substance. These concentrations may vary within wide limits and in each case depend on the most appropriate kind of formulation as solution, emulsion, suspension, dusting powder, paste or granulate. The active substances of the formula (I) are formulated according to known methods. Common types of formulations are described, for example, in U.S. Pat. Nos. 3,134,665 and 3,329,702 and British Patent Specification No. 1,047,644. Some typical examples are given below.

Some of the formulations may be applied over large areas by means of aircraft (dusting, spraying).

The herbicidal agents are used in quantities of 0.01 kg/ha to 20 kg/ha, preferably between 0.1 kg/ha and 10 kg/ha.

Known weed killers may be added in order to widen the range of usefulness. Such weed killers include:

A. Substituted Ureas
N-Phenyl-N',N'-dimethyl-urea
N-(4-chlorophenyl)-N',N'-dimethyl-urea
N-(3,4-dichlorophenyl)-N',N'-dimethyl-urea
N-(4-chlorophenyl)-N'-methoxy-N'-methyl-urea
N-(3,4-dichlorophenyl)-N'-methoxy-N'-methyl-urea
N-(4-bromophenyl)-N'-methoxy-N'-methyl-urea
N(4-bromo-3-chlorophenyl)-N'-methoxy-N'-methyl-urea
N(4-chlorophenyl)-N'-methyl-N'butyl-urea
N(4-chlorophenyl)-N'-methyl-N'-isobutyl-urea
N(4-chlorophenoxyphenyl)-N',N'-dimethyl-urea B. Substituted triazines
2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-isopropylamino-4-methoxyethylamino-6-methylmercapto-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-methoxy-4-ethylamino-6-isopropylamino-s-triazine
2-chlor-4,6-bis(isopropylamino)-s-triazine
2-methylmercapto-4-azido-6-isopropylamino-s-triazine These triazines may be admixed with the compounds of the formula (I) in the ratios 1:10 to 20:1 parts by weight.

C. Phenols
Dinitro-sec-butylphenyl or salts thereof
pentachlorophenol or salts thereof D. Carbonic acids
2,3,6-trichlorobenzoic acid and salts
2,3,5,6-tetrachlorobenzoic acid and salts
2-methoxy-3,5,6-trichlorobenzoic acid and salts
2-methoxy-3,6-dichlorobenzoic acid and salts
3-amino-2,5-dichlorobenzoic acid and salts
3-nitro-2,5-dichlorobenzoic acid and salts
2-methyl-3,6-dichlorobenzoic acid and salts
2,4-dichlorophenoxy acetic acid and salts and esters.
2,4,5-trichlorophenoxy acetic acid and salts and esters (2-methyl-4-chlorophenoxy) acetic acid and salts and esters
2-(2,4,5-trichlorophenoxy)propionic acid and salts and esters
2-(2,4,5-trichlorophenoxy)ethyl-2,2-dichloropropionate
4-(2,4-dichlorophenoxy)butyric acid and salts and esters
4-(2-methyl-4-chlorophenoxy)butyric acid and salts and esters
2,2-dichloropropionic acid E. Carbamic acid derivatives
Isopropyl carbanilate
m-chloro-isopropyl carbanilate
m-chloro-(4-chloro-2-butinyl)-carbanilate
m-trifluoromethyl-isopropyl carbanilate F. Various compounds
2,3,6-trichlorophenyl acetic acid
chloroacetic acid-diallylamide
maleic acid hydrazide
disodium methylarsonic acid
borates
3-amino-triazole
pyrazinderivatives as pyramine
endooxohexahydrophathalic acid
diphenylacetonitrile
Treflan
Balan
Planavin
dimethyl-tetrachloro-phthalic acid
4-trifluoromethyl-2,4'-dinitro-diphenylether
2,4-dichloro-4'-nitro-diphenylether
3-cyclohexyl-6-methyluracil
3-cyclohexyl-6-sec-butyluracil
3-cyclohexyl-5-bromouracil
3-cyclohexyl-5-chlorouracil
3-isopropyl-5-chlorouracil
3-isopropyl-5-bromouracil and other known uracils.

The sulfonanilides of the formula (I) are obtained by reacting an aromatic amine R—NH₂ which is unsubstituted or substituted as indicated, with a halogenmethylsulfonic acid halide, for example by reacting an amine of the formula

 (II)

with halomethylsulfochloride, preferably in the presence of an acid acceptor, such as pyridine or quinoline. In the formula (II) "subst." means 0 to 5 of the substituents mentioned for R = phenyl in formula (I).

The following Example is typical of the method of preparation.

EXAMPLE 1

In a 2.5 liter sulfonating flask, 360 g of 2,4,5-trichloraniline are stirred with 1,200 ml of pyridine. At an internal temperature of 0° C, 276 g of chloromethanesulfochloride are added dropwise and the mixture is stirred for 20 hours, the internal temperature rising to room temperature. The contents of the flask are then introduced into 2.5 liters of water and the whole acidified with 37% HCl. The aqueous phase is decanted and the oily residue is washed with 30% NaOH. The precipitate which forms is discarded. When the mother liquor is acidified, 210 g (= 37 percent of the theory) of chloromethanesulfone-2,4,5-trichloranilide are obtained; the product is recrystallized from isopropanol in the presence of active carbon. Melting point, 109°–110° C (Compound No. 1).

In a similar manner the following compounds are obtained which are especially active selective herbicides:
2. chloromethansulfo-2,4,6-trichloroanilide,
3. chloromethansulfo-2,3,5-trichloroanilide,
4. chloromethansulfo-pentachloroanilide,
5. chloromethansulfo-3,4,5-trichloroanilide,
6. chloromethansulfo-2,5-dichloroanilide, m.p. 107°–108° C
7. chloromethansulfo-2,4-dichloroanilide, m.p. 107°–108° C
8. chloromethansulfo-3,4-dichloroanilide, m.p. 88°–89° C
9. chloromethansulfo-3-bromo-4-chloroanilide,
10. chloromethansulfo-3-chloro-4bromoanilide,
11. chloromethansulfo-3-chloro-4-jodoanilide,
12. chloromethansulfo-3-jodo-4-chloroanilide,
13. chloromethansulfo-3,4-dibromoanilide,
14. chloromethansulfo-2-chloroanilide, m.p. 70°–72° C
15. chloromethansulfo-2-bromoanilide,
16. chloromethansulfo-2-nitroanilide,
17. chloromethansulfo-2-trifluoromethylanilide
18. chloromethansulfo-2-cyanoanilide
19. chloromethansulfo-2,3,4,6-tetrachloroanilide,
20. chloromethansulfo-pentachloroanilide,
21. chloromethansulfo-trichlorotolylaminde,
22. chloromethansulfotrichlorobutoxanilide,
23. chloromethansulfo(trichloroacetic)-trichloroanilide
24. chloromethansulfo(chloroacetic)-trichloroanilide,
25. chloromethansulfo-2-chloro-5-trifluoromethylanilide, m.p. 76°–78° C
26. chloromethansulfo-3-trifluoromethylanilide m.p. 107°–108° C
27. chloromethansulfo-3,5-bis(trifluoromethyl)-anilide, m.p. 98°–99° C
28. chloromethansulfo-3-cyano-5-trifluoromethyl-anilide,
29. chloromethansulfo-2-trifluoromethyl-4-chloroanilide,
30. chloromethansulfo-3-trifluoromethyl-4-chloroanilide,
31. chloromethansulfo-2-fluoro-5-trifluoromethylanilide,
32. chloromethansulfo-3-nitro-5-trifluoromethylanilide,
33. chloromethansulfo-5-chloro-2-trifluoromethylanilide,
34. chloromethansulfo-2,4-dichloro-5-trifluoromethylanilide,
35. chloromethansulfo-2,3,4-trichloro-5-trifluoromethylanilide,
36. chloromethansulfo-4-(methylsulfonyl)-anilide,
37. chloromethansulfo-3-trifluoromethyl-4-methyl-anilide,
38. chloromethansulfo-3-trifluoromethyl-4-chloroanilide, m.p. 90°–91° C
39. chloromethansulfo-3-trifluoromethyl-4-bromoanilide,
40. chlormethansulfo-3-trifluoromethyl-4-jodoanilide,
41. chloromethansulfo-2-chloro-4-nitroanilide, m.p. 114°–116° C 42. chloromethansulfo-3-chloro-4-trifluoromethylanilide,
43. chloromethansulfo-3-nitro-4-chloroanilide, m.p. 133°–134° C
44. chloromethansulfo-3,5-dichloroanilide, m.p. 134° C
45. chloromethansulfo-2-chloro-5-bromoanilide,
46. chloromethansulfo-2-chloro-5-cyanoanilide,
47. chloromethansulfo-2-bromo-5-chloroanilide,
48. chloromethansulfo-2,5-dibromoanilide,
49. chloromethansulfo-2-bromo-5-nitroanilide,
50. chloromethansulfo-2-bromo-5-trifluoromethylanilide,
51. chloromethansulfo-2-bromo-5-cyanoanilide,
52. chloromethansulfo-2-nitro-5-trifluoromethylanilide,
53. chloromethansulfo-2-nitro-5-chloroanilide,
54. chloromethansulfo-2-trifluoromethyl-5-chloroanilide,
55. chloromethansulfo-2-trifluoromethyl-5-nitroanilide,
56. chloromethansulfo-2-cyano-5-chloroanilide,
57. chloromethansulfo-2-cyano-5-bromoanilide,
58. chloromethansulfo-3,5-dichloroanilide,
59. chloromethansulfo-3-chloro-5trifluoromethylanilide,
60. chloromethansulfo-3-nitro-5-chloroanilide,
61. chloromethansulfo-3-nitro-5-trifluoromethylanilide,
62. chloromethansulfo-2,4-dichloro-5-carbethoxyanilide,
63. chloromethansulfo-2,5-dichloro-4-nitrosoanilide,
64. chloromethansulfo-2,5-dichloro-4-nitroanilide,
65. chloromethansulfo-2,5-dichloro-4-cyanoanilide,
66. chloromethansulfo-2,5-dichloro-4-methylcarbonylanilide,
67. chloromethansulfo-2,4-dichloro-5-trifluoromethylanilide,
68. chloromethansulfo-2,4-dibromo-5-trifluoromethylanilide,
69. chloromethansulfo-2,4-dibromo-5-carbethoxyanilide,
70. chloromethansulfo-2,5-dibromo-4-nitrosoanilide,
71. chloromethansulfo-2,5-dibromo-4-nitroanilide,
72. chloromethansulfo-2,5-dibromo-4-methylcarbonylanilide,
73. chloromethansulfo-2-chloro-4,5-bis[carbethoxy]anilide,
74. chloromethansulfo-2-nitro-5-trichloromethylanilide,
75. chloromethansulfo-2-chloro-5-trichloromethylanilide,
76. chloromethansulfo-2-bromo-5-trichloromethylanilide,
77. chloromethansulfo-3-chloro-5-trichloromethylanilide,
78. chloromethansulfo-3-bromo-5-trichloromethylanilide,
79. chloromethansulfo-3-nitro-5-trichloromethylanilide,
80. chloromethansulfo-2,4-dichloro-5-trichloromethylanilide,
81. chloromethansulfo-2,5-dichloro-4-trichloromethylanilide,
82. bromomethansulfo-2,4,5-trichloroanilide,
83. bromomethansulfo-pentachloroanilide,
84. bromomethansulfo-3,4-dichloroanilide,
85. bromomethansulfo-3-chloro-4-bromoanilide,
86. bromomethansulfo-3-bromo-4-chloroanilide,
87. bromomethansulfo-4-chloroanilide,
88. bromoethansulfo-4-bromoanildie,
89. bromomethansulfo-3-trifluoromethylanilide

EXAMPLES OF FORMULATIONS

Dusting Agents

Equal parts of an active substance according to this invention and precipitated silica are finely ground. Dusting agents with a preferred content of active substance of 1 — 6 percent can be made therefrom by admixing kaoline or talcum.

Spraying Powder

To obtain a spraying powder, for example the following components are mixed and finely ground:
50 parts of active substance according to this invention,
20 parts of highly adsorptive silica
25 parts of bolus alba (kaolin)
3.5 parts of sodium 1-benzyl-2-stearyl-benzimidazole-6,3'-disulfonate.

Emulsion Concentrate

Readily soluble active substances can also be formulated as emulsion concentrates according to the following instruction:
20 parts of active substance
70 parts of xylene
10 parts of a mixture of a reaction product of an alkyl phenol with ethylene oxide and calcium dodecylbenzenesulfonate are mixed. On dilution with water to the desired concentration, a sprayable emulsion is obtained.

Granulates 7.5 g of one of the active substances of the formula (I) are dissolved in 100 ml of acetone and the resulting acetonic solution is poured on to 92 g of granulated attapulgite (mesh size, 24/28 meshes per inch). The whole is well mixed and the solvent expelled in a rotary evaporator. A granulate with a 7.5 percent content of active substance is obtained.

EXAMPLE 2

In pre-emergence and post-emergence tests, compounds of the formula (I) are very harmful to dicotyle-

| Compound No. | Pre-emergence | | | | | | | | Post-emergence | | | | | | | |
|---|---|---|---|---|---|---|---|---|---|---|---|---|---|---|---|---|
| | Avena | | Setaria | | Sinapis | | Lepidium | | Avena | | Setaria | | Sinapis | | Lepidium | |
| | A | B | A | B | A | B | A | B | A | B | A | B | A | B | A | B |
| 1 | 1 | 1 | 1 | 1 | 9 | 9 | 9 | 9 | 4 | 4 | 4 | 4 | 9 | 9 | 9 | 9 |
| 6 | 1 | 1 | 1 | 1 | 2 | 1 | 2 | 1 | 1 | 1 | 1 | 0 | 9 | 9 | 9 | 9 |
| 8 | 1 | 1 | 1 | 1 | 1 | 1 | 1 | 1 | 4 | 2 | 4 | 3 | 9 | 9 | 9 | 9 |
| 26 | 1 | 1 | 1 | 1 | 2 | 1 | 1 | 1 | 1 | 1 | 1 | 1 | 9 | 8 | 9 | 7 |
| 7 | 1 | 1 | 1 | 1 | 2 | 1 | 6 | 1 | 2 | 2 | 2 | 2 | 9 | 9 | 9 | 9 |
| 27 | 2 | 1 | 2 | 1 | 3 | 1 | 7 | 4 | 5 | 4 | 7 | 5 | 9 | 9 | 9 | 9 |
| 38 | 1 | 1 | 1 | 1 | 1 | 1 | 4 | 2 | 4 | 3 | 4 | 4 | 9 | 9 | 9 | 9 |
| 41 | 1 | 1 | 1 | 1 | 6 | 6 | 8 | 8 | 2 | 2 | 2 | 2 | 9 | 8 | 9 | 9 |
| 43 | 1 | 1 | 1 | 1 | 2 | 1 | 5 | 3 | 1 | 1 | 4 | 4 | 9 | 9 | 9 | 9 |
| 14 | 1 | 1 | 1 | 1 | 1 | 1 | 3 | 1 | 1 | 1 | 1 | 2 | 8 | 7 | 9 | 9 |
| 25 | 1 | 1 | 1 | 1 | 9 | 6 | 4 | 2 | 1 | 1 | 3 | 2 | 9 | 9 | 9 | 9 |
| 44 | 1 | 1 | 1 | 1 | 1 | 1 | 1 | 1 | 1 | 1 | 1 | 1 | 9 | 9 | 9 | 9 |

NOTE.—A=5 kg. of active substance/ha; B=2.5 kg. of active substance/ha.

dons sown in clay pots and treated with aqueous preparations of the active substances, whereas monocotyledons are hardly affected, if at all.

EXAMPLE 3

In a second experiment aqueous solutions of the active substances mentioned are used in a post-emergence test two weeks after sowing the test plants mentioned in the Table, that is to say, when they had reached the 2 to 3-leaf stage.

Quantity employed: 2.0 kg or 1.0 kg of the active substance No. 1.

TABLE

| Culture | Quantity used | | |
|---|---|---|---|
| | 2.0 | 1.0 | kg AS/ha |
| Triticum | 3 | 3 | |
| Hordeum | 4 | 2 | |
| Zea | 2 | 1 | |
| Weeds | | | |
| Galium | 6 | 6 | |
| Calendula | 9 | 9 | |
| Chrysanthemum | 9 | 9 | |
| Brassica | 9 | 9 | |
| Ipomoea | 9 | 9 | |
| Stellaria | 9 | 9 | |
| Amaranthus | 9 | 9 | |

Legend: 1 — 3 = no noteworthy damage to the plant
4 — 7 = damage to the plant
8 — 9 = plant no longer viable

We claim:

1. A process for combatting weeds in the presence of crop plants which comprises applying to the crop growing area a herbicidally effective amount of chloromethanesulfone-2,4,5-trichloroanilide.

* * * * *

UNITED STATES PATENT OFFICE
CERTIFICATE OF CORRECTION

Patent No. 3,734,710　　　　　　Dated May 22, 1973

Inventor(s) ALFONS LUKASZCZYK and GEORG PISSIOTAS

It is certified that error appears in the above-identified patent and that said Letters Patent are hereby corrected as shown below:

Correct the assignee's name to read

-- CIBA-GEIGY AG --

Signed and sealed this 5th day of February 1974.

(SEAL)
Attest:

EDWARD M. FLETCHER, JR.　　　　　　RENE D. TEGTMEYER
Attesting Officer　　　　　　　　　　Acting Commissioner of Patents